July 6, 1971     C. P. GRATTON     3,591,453
METHOD OF OPERATING A GAS COOLED FAST BREEDER REACTOR
Filed March 18, 1968
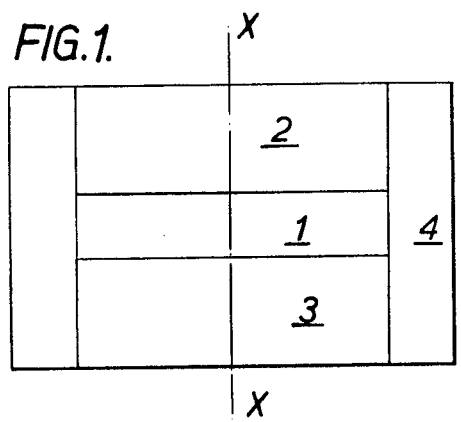
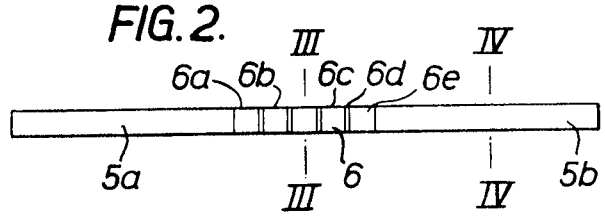
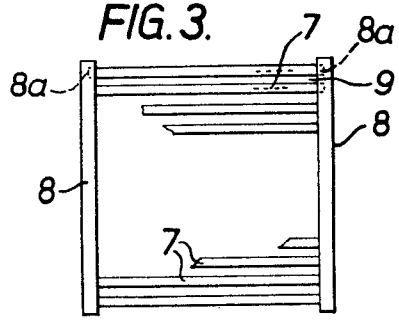
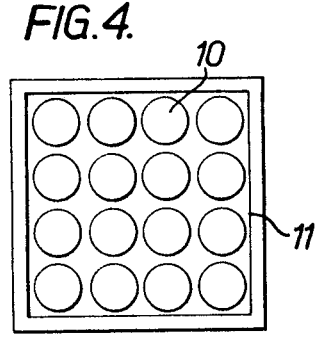
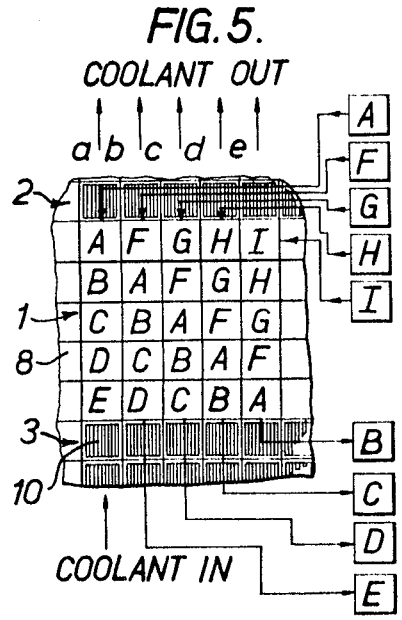

United States Patent Office 3,591,453
Patented July 6, 1971

3,591,453
METHOD OF OPERATING A GAS COOLED FAST BREEDER REACTOR
Charles Peter Gratton, Dorchester, Dorset, England, assignor to United Kingdom Atomic Energy Authority, London, England
Filed Mar. 18, 1968, Ser. No. 713,601
Claims priority, application Great Britain, Apr. 4, 1967, 15,418/67
Int. Cl. G21g 1/00
U.S. Cl. 176—18                                              2 Claims

ABSTRACT OF THE DISCLOSURE

A method of operating a fast breeder reactor in which the coolant is passed serially through at least one part of the blanket and the core in series which method resides in causing the fissile fuel to move through the core in counterflow to the coolant flow direction and the fertile fuel in concurrent flow with the coolant flow direction.

BACKGROUND OF THE INVENTION

This invention relates to nuclear reactors particularly reactors cooled by gas and in the main to reactors having a higher than thermal neutron spectrum, referred to as a fast reactor.

SUMMARY OF THE INVENTION

According to the invention a gas cooled fast nuclear reactor comprises a fissile core and a blanket of fertile fuel, coolant channels extending serially through the core and at least part of the blanket, the fuel in the core and the blanket being each in the form of separable assemblies with provision so that the fissile fuel assemblies can be moved towards the lower temperature end of the coolant channel and fertile fuel assemblies towards the higher temperature end of the coolant channel as burnup proceeds.

The fissile fuel is preferably cermet in plate form, a number of similar plates being supported in parallel planes in a frame in spaced apart relationship to define between each plate and its neighbour a coolant passage. Several such assemblies placed end to end with the coolant passages contiguous form a channel by which coolant passes through the core to effect heat removal with a low pressure drop.

Preferably the fuel in the cermet plates is plutionium or a mixture of plutonium isotopes. The density of distribution of the plutonium in the plate metal, e.g. stainless steel, is preferably less than 40-30 percent by volume so as to give irradiation stability, the plutonium being distributed as particles whose inherent density is well below its theoretical density, say 60 percent theoretical density, so as to allow fuel volume to increase under irradiation at operational temperatures. By this means, a fuel plate can be constructed which will withstand not only very high burn-ups and high temperatures but also the rigours of mechanical handling necessary for fuel shuffling between successive irradiation periods.

An advantageous core configuration in respect of a fast breeder reactor comprises a fissile core, as aforesaid, surrounded by blanket containing fertile fuel, the whole cooled by gas forced through it. In the central core, the coolant passes through plutonium containing cermet sheets supported edge on to the flow direction and presenting a flowpath in said central fissile core which may be shorter by a factor of 2 than the flowpath presented in the upstream or downstream portions of the blanket. The fuel in the blanket which is of a lower rating than that in the core may be bulk fertile fuel oxide.

In fact, the preferred shape of core is cylindrical with the coolant channels running parallel to the cylinder axis and extending through channels in the upstream and downstream axial blankets. The axial length/diameter ratio of the core may be within the range 1:2 and 1:8. The preferred ratio is 1:6.

Preferably also, some 20 percent of the overall power output is extracted in the blanket, heat in the downstream blanket being derived from the interaction of neutrons leaking from the core with fissile plutonium bred in the blanket. It is one feature of the reactor that this bonus of power contributed by the blanket is a substantial proportion of the total otuput in contrast to the usual 5 or 6 percent in fast reactors proposed hitherto. This permits the use of a fissile fuel in the core having a lower rating.

The production of power in the blanket may be sustained by a blanket fuel shuffling scheme such that at all times there is a significant plutonium concentration in the downstream blanket. The temperature of coolant leaving the channels in the downstream blanket can be arranged to be significantly greater than the outlet temperature from the core by planned shuffling of fuel from the upstream blanket to position in the downstream blanket at periods coincident with those during which toe shuffling of fissile fuel in the core takes place.

A typical shuffling scheme would enable the upstream blanket to generate 7 percent, and the downstream blanket 13 percent, of the total output power continuously by moving fertile fuel from the upstream blanket to the downstream blanket to replace fuel removed from the downstream blanket for reprocessing. Fresh fertile fuel is of course added firstly to the upstream blanket.

The core and blanket shuffling systems combine to provide a fast breeder reactor operational method according to the invention in which fissile fuel traverses the core from a high temperature region to a lower temperature region as its irradiation dose increases, while fertile fuel moves from the low temperature region of the blanket to a higher temperature region of the blanket as its irradiation dose increases.

A method of operating a gas cooled fast breeder nuclear reactor thus evolves in which gas coolant is passed serially through at least one part of the blanket and through the core resides in causing the fissile fuel to move intermittently through the core in counterflow to coolant flow direction and the fertile fuel through the blanket concurrent with the coolant flow direction whereby at least 15 percent of the power is extracted from the blanket.

DESCRIPTION OF THE DRAWINGS

The invention will now be described with reference to the accompanying drawings in which:

FIG. 1 is a diagram showing the core in cross-section;
FIG. 2 is a diagram of a typical fuel element;
FIG. 3 is a diagrammatic cross-section on the line III—III of FIG. 2;
FIG. 4 is a diagrammatic cross-section on the line IV—IV of FIG. 2; and
FIG. 5 is a diagram for explaining one shuffling scheme.

DESCRIPTION OF THE PREFERRED EMBODIMENT

Referring firstly to FIG. 1, the fast breeder reactor configuration shown comprises a cylindrical core 1 with axial blankets 2 and 3 and a radial, annular, blanket 4 symetrically disposed about vertical axis X—X. Thus, from the proportions shown in the drawing, for an overall height of 230 cms. and overall diameter of 460 cms. each axial blanket would be 90 cms. tall and the intervening core 50 cms. A suitable fuel element would be that shown in FIG. 2 where each axial blanket portion 5a, 5b of the element is nearly twice as long as the central fissile portion 6. The latter is divided into five sections for fuel shuffling purposes and this allows each section to be of easily manageable size. Conveniently, each section 6a–6e takes the form of an assembly of cermet fuel plates 7 (FIG. 3) which are slotted into a pair of parallel grooves 8a in side member 8, so as to leave intervening slots 9 for coolant flow. It is proposed that the fuel meat in the cermet is 30 percent by volume and that this be in the form of low density plutonium ceramic, say 60 percent theoretical density.

The blanket fuel is shown in cross-section in FIG. 4 and this is in the form of fertile fuel pins 10 of conventional form supported (by means not shown) in a square section sheath 11 of similar sized cross-section to the fissile fuel assembly FIG. 3.

As shown in FIG. 2, the fissile fuel section is divided in five sections 6a–6e, each composed of an assembly of plates shown in FIG. 3. Each will be some 10 cms. in length. They thus lend themselves to an advantageous fuel management scheme as follows:

After a fuel channel has been irradiated in fast neutron flux for a given period, say 180 days, the fuel assembly is withdrawn from the reactor. The uppermost section is removed (i.e. the downstream section) the remaining four sections are moved along and a new fuel section inserted at the high temperature end of the assembly.

This procedure is repeated after each irradiation period with the fresh fuel section providing power at the highest temperature. Now with cermets, experimental conclusions indicate that burnup achievable is considerably less at high temperature than at low temperature. The most aged fuel section completes its burnup at lower temperature and so the maximum burnup is achieved from each fuel section. By this means a high overall burnup is achieved of fuel distribution with low density throughout the core.

FIG. 5 is a diagram of the preferred shuffling system for the fissile core. Five channels a–e are shown as neighboring channels are meant to represent the fuel positions in the same channel at five successive periods of irradiation and hence a, b, c, d, e, can be considered as five consecutive, equal periods. The coolant flow direction is vertically upwards as indicated so that the mean core temperatures increase towards the top. At period a of operation new fuel A is inserted in the highest temperature region at the top of the core, the underlying fuel assemblies B–E having had successively longer periods of irradiation as indicated. After period a has terminated, the lowermost fuel assembly E having had five periods of irradiation is discharged; the other fuel assembles above moved down en bloc, as it were, and a new fuel assembly F introduced at the top. Period b commences and, when terminated, the lowermost fuel assembly, indicated at D, now having endured five periods is discharged at the low temperature end of the core and a new fuel assembly G is introduced at the topmost position and so on.

At periods of shuffling of the fissile core the blanket fuel is preferably also shuffled, with the object of moving fertile fuel from the cold, upstream blanket 3 into the hot, downstream blanket 2 in a manner to ensure that substantial (say 20 percent) of the power is generated comes from the blanket.

In a typical case, quoted here by way of example only, the reactor core has the following volume fractions:

Fuel _____ 0.1607
Steel _____ 0.5045
Coolant _____ 0.3348

As the fuel, "civil plutonium" is used. The isotopic composition of "civil plutonium" is Pu239—80 percent, Pu240—16 percent, Pu241–4 percent. The enrichment is varied across the core cross-section at right angles to the coolant flow direction so that there is an outer zone with fuel enriched to 75 percent and an inner zone of 62 percent enrichment.

I claim:

1. A method of operating a gas cooled fast breeder reactor which resides in causing the fissle fuel to move between periods of irradiation through the core in a direction counterflow to the coolant flow; in causing the fertile fuel to move through at least a part of the blanket in the direction of the coolant flow; and in withdrawing used fuel and replacing the withdrawn fuel with new fuel as required.

2. A method of operating a gas cooled fast breeder rector having a fissile core with coolant channels and upstream and downstream blanket parts cooled serially by gas coolant which method resides in removing a fissile fuel assembly at the upstream end of the core after a given period of operation, moving the other fissile fuel assembles en bloc towards the upstream end of the core, inserting a fresh unirradiated fissile fuel assembly at the downstream end of the core and simultaneously moving a fertile fuel assembly from its position in the upstream blanket portion to the downstream blanket portion having removed from the downstream portion an irradiated fertile fuel assembly, operating the reactor for a further period and repeating the procedure.

References Cited

UNITED STATES PATENTS

| | | | |
|---|---|---|---|
| 3,208,912 | 9/1965 | Jaye et al. | 176—16 |
| 3,309,277 | 3/1967 | Jaye et al. | 176—16 |
| 3,344,032 | 9/1967 | Vendryes et al. | 176—40 |
| 3,362,882 | 1/1968 | Sofer et al. | 176—18 |
| 3,364,119 | 1/1968 | Nims et al. | 176—18 |
| 3,396,078 | 8/1968 | Visner | 176—17 |

OTHER REFERENCES

Proceedings of the Third International Conference on the Peaceful Uses of Atomic Energy, vol. 6, United Nations 1965, pp. 80—87 (an article by P. Fortescue et al.).

REUBEN EPSTEIN, Primary Examiner

U.S. Cl. X.R.

176—40